United States Patent
Chen

(10) Patent No.: US 12,497,982 B2
(45) Date of Patent: Dec. 16, 2025

(54) MAGNETIC COMPUTER CASE

(71) Applicant: Chien-Hao Chen, Keelung (TW)

(72) Inventor: Chien-Hao Chen, Keelung (TW)

( * ) Notice: Subject to any disclaimer, the term of this patent is extended or adjusted under 35 U.S.C. 154(b) by 141 days.

(21) Appl. No.: 18/460,088

(22) Filed: Sep. 1, 2023

(65) Prior Publication Data

US 2024/0401621 A1    Dec. 5, 2024

(30) Foreign Application Priority Data

May 29, 2023   (TW) ................................. 112205371

(51) Int. Cl.
*F16B 5/00* (2006.01)
*G06F 1/18* (2006.01)

(52) U.S. Cl.
CPC ............ *F16B 5/0004* (2013.01); *G06F 1/181* (2013.01)

(58) Field of Classification Search
CPC ........... G06F 1/16; G06F 1/181; F16B 5/0004
USPC ............................................. 312/140, 223.2
See application file for complete search history.

(56) References Cited

U.S. PATENT DOCUMENTS

| | | | | |
|---|---|---|---|---|
| 3,998,509 A * | 12/1976 | Hauser | ...................... | A47F 3/12 D6/661 |
| 8,038,233 B2 * | 10/2011 | Pezzoni | .................... | A47F 3/12 312/138.1 |
| 2005/0068723 A1 * | 3/2005 | Squillante | ............... | G06F 1/181 361/679.46 |
| 2008/0266773 A1 * | 10/2008 | Szolyga | ................... | G06F 1/182 361/679.6 |
| 2015/0022971 A1 * | 1/2015 | Jung | ....................... | G06F 1/181 361/679.58 |
| 2018/0196471 A1 * | 7/2018 | Soken | ........................ | G06F 1/18 |
| 2024/0264644 A1 * | 8/2024 | Gray | ........................ | G06F 1/187 |

FOREIGN PATENT DOCUMENTS

CN      111638769      *  9/2020 ............... G06F 1/18

* cited by examiner

*Primary Examiner* — James O Hansen

(74) *Attorney, Agent, or Firm* — Muncy, Geissler, Olds & Lowe, P.C.

(57) ABSTRACT

The present invention provides a magnetic computer case comprising a first plate body, a second plate body and a third plate body. The first plate body is provided with a first connection part, where the first connection part is provided at a corner of the first plate body. The second plate body is provided on one side of the first plate body and provided with a second connection part, where the second connection part is provided at a corner of the second plate body. The second plate body is provided with a third connection part and the third connection part is provided at a corner of the third plate body, such that the first plate body is movably and magnetically connected with the third plate body and the second plate body.

3 Claims, 4 Drawing Sheets

MAGNETIC COMPUTER CASE

FIELD OF THE INVENTION

The present invention is related to a magnetic computer case, especially a magnetic computer case that can make the plates of the computer case to be movably and magnetically connected with each other.

BACKGROUND OF THE INVENTION

In the prior art, in order to beautify the appearance of computer cases and to give users a pleasant aesthetic experience when the users use computers, many computer cases or hardware components therein are additionally provided with some light-emitting elements, so as to enhance the aesthetic feeling for the computer cases and increase the users' pleasures when the users use the computers. Furthermore, a computer case structurally composed of six plates is usually provided with a frame structure at each adjacent place between two plates to fix the plate. However, if at least one of the plates is made of light-transmitting material, such a frame structure will easily affect the luminous effect produced by the light-emitting elements provided in the computer cases or on the hardware components.

Furthermore, in the prior art, the plates of the computer case are usually fixed to each other by using engaging structures, bolts and other structures. However, whenever a user is required to replace the hardware components or to replace the light-emitting elements arranged on the hardware components for the sake of changing the appearance, such engaging structures provided on each plate will make it time-consuming and inconvenient for the user to disassemble or assemble the plates.

In view of this, in order to improve the above disadvantages, the inventor has continuously made researches and finally developed the present invention.

SUMMARY OF THE INVENTION

In view of this, in order to provide a structure different from the conventional technology and to overcome the above disadvantages for the conventional computer cases, the applicant has accumulated experiences for many years and made continuous research and development, so as to invent the present invention.

The main object of the present invention is to provide a magnetic computer case, so as to solve following technical problems: that the frame structure of a computer case in the prior art will affect the luminous effect produced by the light-emitting elements provided in the computer casing or on the hardware components; and that when the users disassemble or assemble the hardware components or the light-emitting elements provided on the hardware components for the sake of changing the appearance, the engaging structure and the bolt structure and the like provided on each plate of the conventional computer case will make it time-consuming and inconvenient for the user to disassemble and assemble the plates.

In order to solve the above technical problems and to achieve the expected technical effect, the present invention provides a magnetic computer case comprising a first plate body, a second plate body and a third plate body. The first plate body is provided with a first connection part, where the first connection part is provided at a corner of the first plate body. The second plate body is provided on one side of the first plate body and provided with a second connection part, where the second connection part is provided at a corner of the second plate body. The third plate body is adjacent to one side of the first plate body and one side of the second plate body, where the third plate body is provided with a third connection part and the third connection part is provided at a corner of the third plate body; wherein the first connection part is provided with a first connection surface and a second connection surface, and the first connection surface and the second connection surface are respectively in a magnetic connection with the third connection part and the second connection part, such that the first plate body is movably and magnetically connected with the third plate body and the second plate body respectively.

In implementation, the second connection surface is further provided with a concave part, and the second connection part is provided with a convex part for the second connection part to be engaged with the second connection surface.

In implementation, at least one of the first plate body, the second plate body and the third plate body is made of light-transmitting material.

In implementation, the first connection part is made of magnetic material, and the second connection part and the third connection part are made of metal material.

In implementation, the second connection part is made of magnetic material, the first connection part is made of metal material, and the third connection part is made of magnetic material.

In implementation, the second connection part and the third connection part are made of magnetic material and the first connection part is made of metal material.

In implementation, the first plate body is a front panel, the second plate body is a lateral panel, and the third plate body is a top cover panel.

For further understanding the characteristics and effects of the present invention, some preferred embodiments referred to drawings are in detail described as follows.

DETAILED DESCRIPTIONS OF PREFERRED EMBODIMENTS

Figure 1:
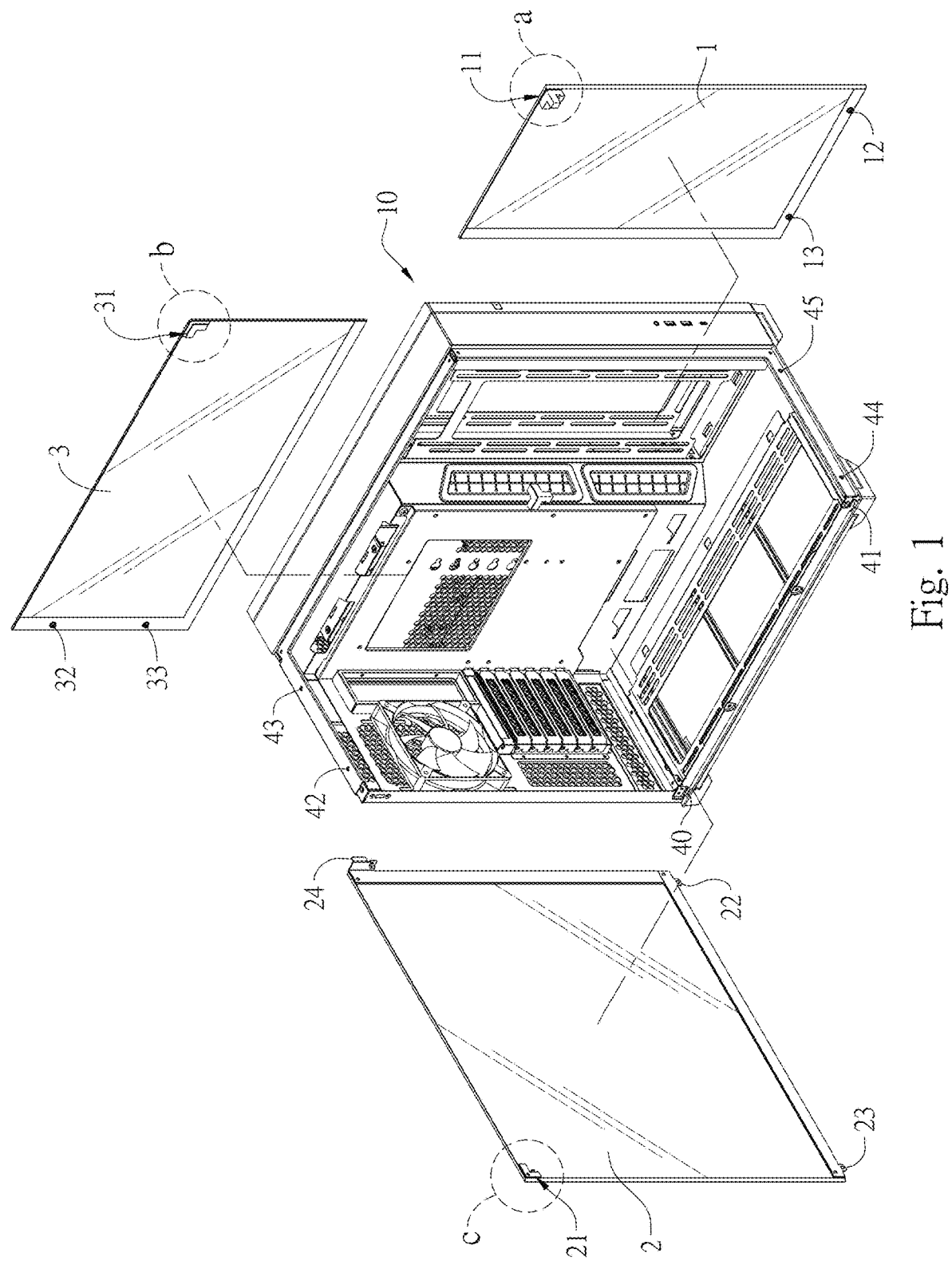
FIG. 1 is an exploded view of the components of a preferred embodiment of the magnetic computer case of the present invention.
Figure 2:
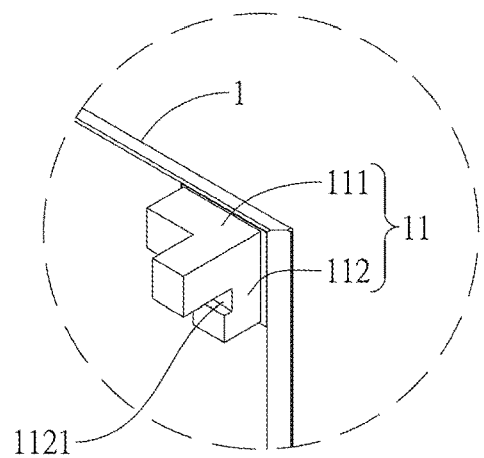
FIG. 2 is a schematic structural view of a preferred embodiment of the magnetic computer case of the present invention.
Figure 3:
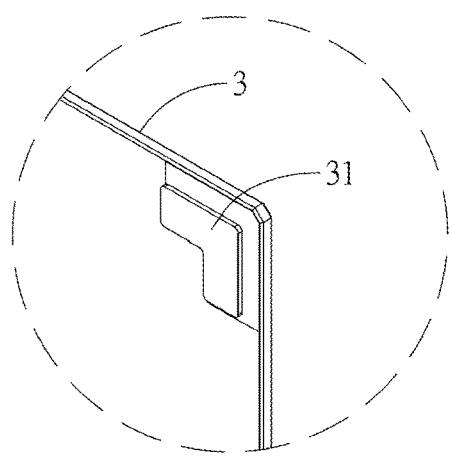
FIG. 3 is a schematic structural view of a preferred embodiment of the magnetic computer case of the present invention.
Figure 4:
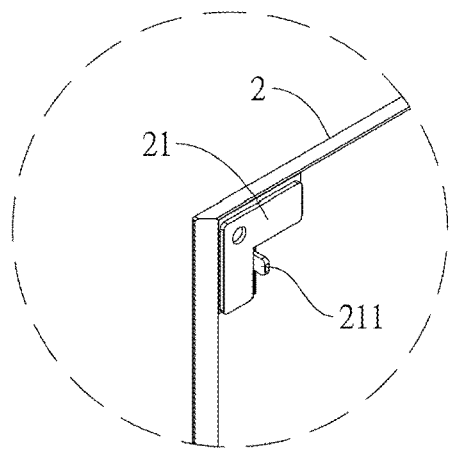
FIG. 4 is a schematic structural view of a preferred embodiment of the magnetic computer case of the present invention.
Figure 5:
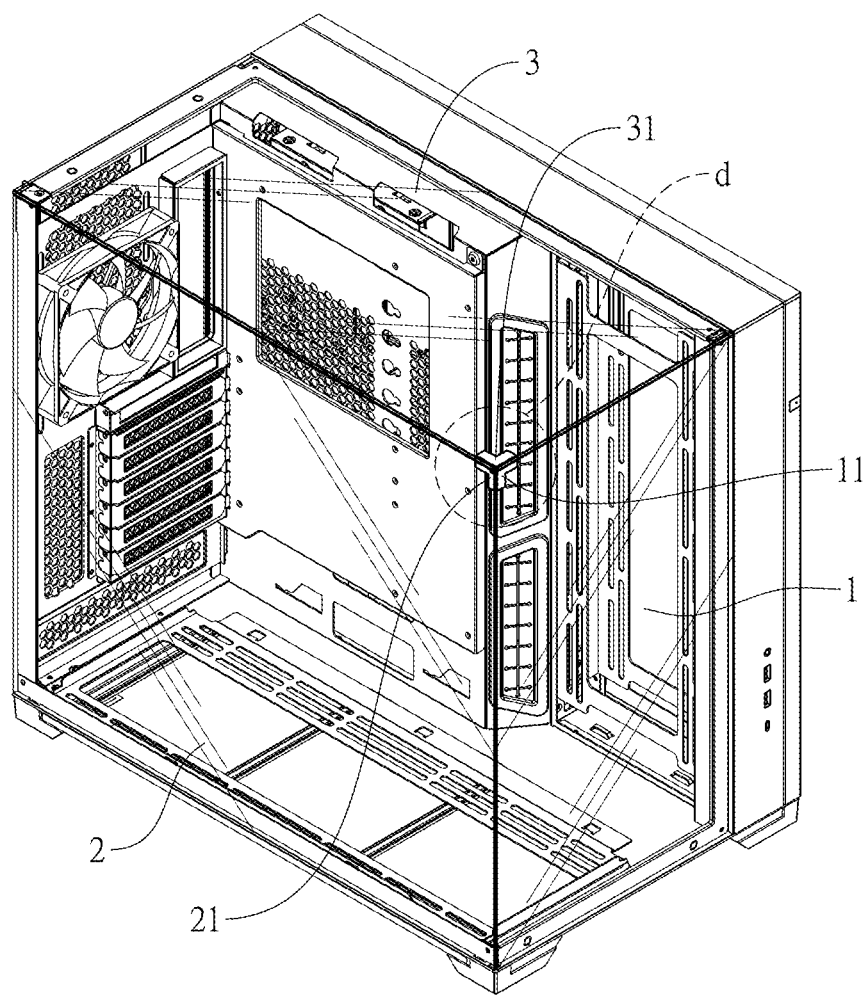
FIG. 5 is a schematic view showing the use state of a preferred embodiment of the magnetic computer case of the present invention.

Please refer to FIGS. 1 and 5, the present invention provides a magnetic computer case comprising a main body 10, a first plate body 1, a second plate body 2 and a third plate body 3. Please refer to FIGS. 2 to 4, in FIG. 2, the first plate body 1 is provided with a first connection part 11, where the first connection part 11 is provided at a top-right corner of the first plate body 1. In FIG. 4, the second plate body 2 is provided on one side of the first plate body 1 and provided with a second connection part 21, where the second connection part 21 is provided at a top-front corner of the second plate body 2. In FIG. 3, the third plate body 3 is adjacent to one side of the first plate body 1 and one side of the second plate body 2, where the third plate body 3 is provided with a third connection part 31 and the third connection part 31 is provided at a front-right corner of the third plate body 3. Please refer to FIG. 1, the first plate body 1 is a front panel, the second plate body 2 is a lateral panel, and the third plate body 3 is a top cover panel. Two positioning posts 12, 13 are provided at a bottom side of the first plate body 1. Two positioning pins 22, 23 are provided at a bottom edge of the second plate body 2. A protrusion portion 24 is provided at a top-rear corner of the second plate body 2. Two positioning posts 32, 33 are provided at a rear side of the third plate body 3. Two positioning holes 42, 43 respectively corresponding to the two positioning posts 32, 33 of the third plate body 3 are provided at a top-rear side of the main body 10. Two positioning holes 44, 45 respectively corresponding to the two positioning posts 12, 13 of the first plate body 1 are provided at a front-bottom side of the main body 10. Two grooves 40, 41 respectively corresponding to the two positioning pins 22, 23 of the second plate body 2 are provided at a bottom-right side of the main body 10.

In another embodiment, at least one of the first plate body 1, the second plate body 2 and the third plate body 3 is made of light-transmitting material. In the preferred embodiment, in order to enable users to have the best experience, the first plate body 1, the second plate body 2 and the third plate body 3 can all be made of light-transmitting material, such that the light-emitting elements provided on the hardware or in the computer case can produce beautiful visual effects at various angles of the computer case.

Figure 6:
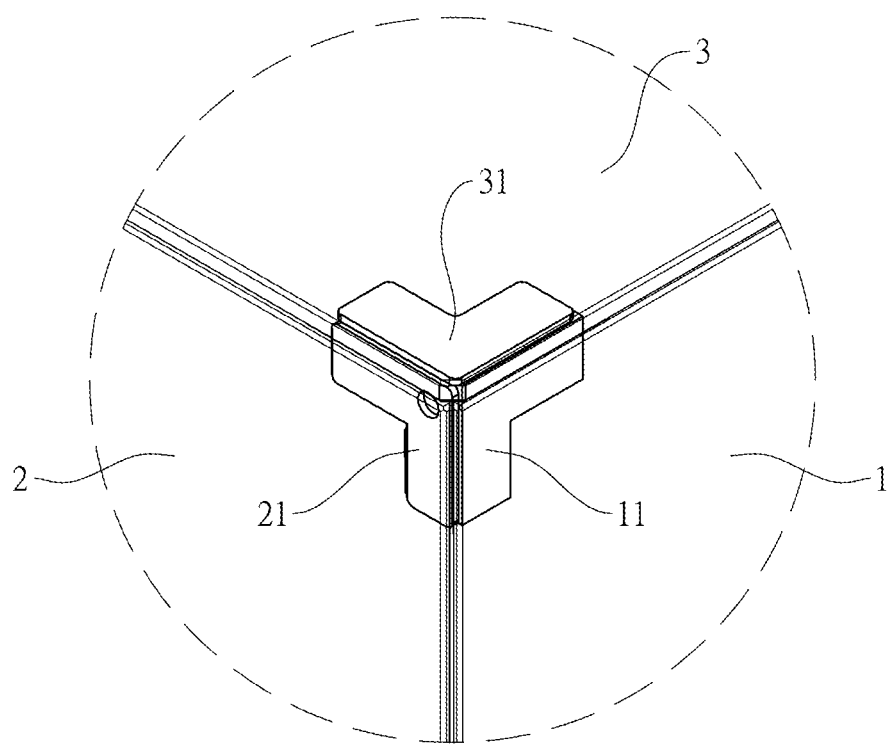
FIG. 6 is a schematic view showing the use state of a preferred embodiment of the magnetic computer case of the present invention.
Figure 7:
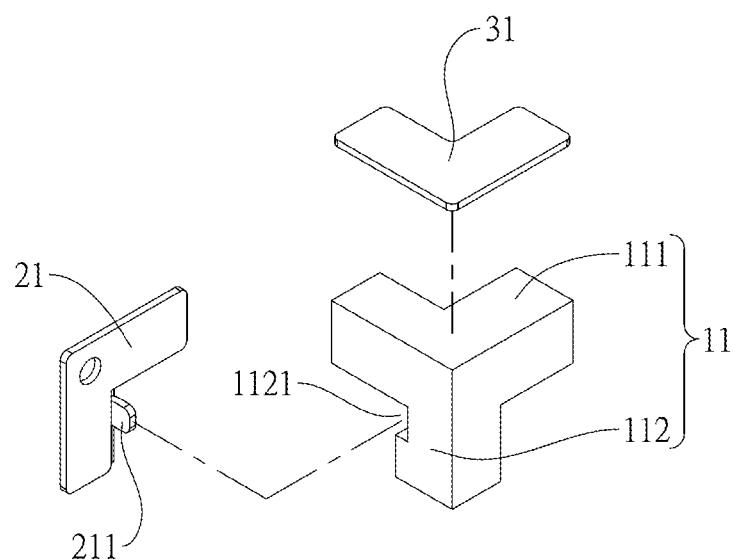
FIG. 7 is an exploded view of the components of a preferred embodiment of the magnetic computer case of the present invention.

Please refer to FIGS. 6 to 7, wherein the first connection part 11 is provided with a first connection surface 111 and a second connection surface 112. The rear side of the third plate body 3 is fixed to the top-rear side of the main body 10 by positioning the two positioning posts 32, 33 of the third plate body 3 in the two positioning holes 42, 43 of the main body 10 respectively. The bottom side of the first plate body 1 is fixed to the front-bottom side of the main body 10 by positioning the two positioning posts 12, 13 of the first plate body 1 in the two positioning holes 44, 45 of the main body 10 respectively. The two positioning pins 22, 23 of the second plate body 2 are inserted into the two grooves 40, 41 of the main body 10 respectively, and the first connection surface 111 and the second connection surface 112 are respectively in a magnetic connection with the third connection part 31 and the second connection part 21, such that the first plate body 1 is movably and magnetically connected with the third plate body 3 and the second plate body 2 respectively.

In another embodiment, the second connection surface 112 is further provided with a concave part 1121, and the second connection part 21 is provided with a convex part 211 for the second connection part 21 to be engaged with the second connection surface 112. The arrangement of the present invention is to have the second connection part 21 be connected with the second connection surface 112 in a snap-fitting manner in addition to the magnetic force, such that the second plate body 2 provided on the lateral side can be more firmly connected with the first plate body 1.

In another embodiment, the first connection part 11 is made of magnetic material, and the second connection part 21 and the third connection part 31 are made of metal material, such that the first plate body 1 is movably and magnetically connected with the second plate body 2 and the third plate body 3 respectively.

In another embodiment, the second connection part 21 is made of magnetic material, the first connection part 11 is made of metal material, and the third connection part 31 is made of magnetic material, such that the second plate body 2 is movably and magnetically connected with the first plate body 1 and the third plate body 3 respectively.

In another embodiment, the second connection part 21 and the third connection part 31 are made of magnetic material, and the first connection part 11 is made of metal material, such that the second plate body 2 is movably and magnetically connected with the third plate body 3 and the first plate body 1 respectively.

In other words, the present invention can select suitable materials for the first connection part 11, the second connection part 21, the third connection part 31, the first connection surface 111, and the second connection surface 112 according to the overall budget or the users' needs.

Thus, through the above described design, the present invention has at least one of the following advantages:
1. In the present invention, the first connection part is provided with a first connection surface and a second connection surface, and the first connection surface and the second connection surface are respectively in a magnetic connection with the second connection part and the third connection part, such that the first plate body is movably and magnetically connected with the third plate body and the second plate body, and thus users can easily disassemble and assemble the plates when it is required to replace hardware components.
2. In the present invention, by the overall configuration of the first connection part, the second connection part and the third connection part, there is no need to provide any frame structure at the adjacent place between two plates as in the prior art, such that the luminous effect produced by the light-emitting elements provided in the computer case or in the hardware components can be optimized.
3. In the present invention, to have the first connection part to be made of magnetic material and the second connection part and the third connection part to be made of metal material, or to have one of the first connection surface or the second connection surface to be made of magnetic material and other combinations thereof, makes it able to save or effectively adjust the cost of the overall material according to actual needs.
4. Each plate body of the present invention can be made of light-transmitting material, such that the light-emitting elements provided in the computer case or in the hardware components can produce beautiful visual effects at various angles of the computer case.

As disclosed in the above description and attached drawings, the present invention can provide a magnetic computer case. It is new and can be put into industrial use.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:

1. A magnetic computer case, comprising:
   a first plate body, provided with a first connection part, where the first connection part is provided at a top-right corner of the first plate body, wherein the first plate body is a front panel, two positioning posts are provided at a bottom side of the first plate body;
   a second plate body, provided on one side of the first plate body and provided with a second connection part, where the second connection part is provided at a top-front corner of the second plate body, wherein the second plate body is a lateral panel, two positioning pins are provided at a bottom edge of the second plate body;
   a third plate body, adjacent to one side of the first plate body and one side of the second plate body, where the third plate body is provided with a third connection part and the third connection part is provided at a front-right corner of the third plate body, wherein the third plate body is a top cover panel, two positioning posts are provided at a rear side of the third plate body, wherein the first connection part is made of magnetic material and the second connection part and the third connection part are made of metal material, or the first connection part is made of metal material and the second connection part and the third connection part are made of magnetic material; and
   a main body, wherein two positioning holes are provided at a top-rear side of the main body for positioning the two positioning posts of the third plate body respectively, two positioning holes are provided at a front-bottom side of the main body for positioning the two positioning posts of the first plate body respectively, two grooves respectively corresponding to the two positioning pins of the second plate body are provided at a bottom-right side of the main body;
   wherein the first connection part is provided with a first connection surface and a second connection surface, wherein the two positioning pins of the second plate body are inserted into the two grooves of the main body respectively, and the first connection surface and the second connection surface are respectively in a magnetic connection with the third connection part and the second connection part, such that the first plate body is movably and magnetically connected with the third plate body and the second plate body respectively.

2. The magnetic computer case according to claim 1, wherein the second connection surface is further provided with a concave part and the second connection part is provided with a convex part for the second connection part to be engaged with the second connection surface.

3. The magnetic computer case according to claim 1, wherein at least one of the first plate body, the second plate body and the third plate body is made of light-transmitting material.

* * * * *